United States Patent [19]
Ilg et al.

[11] Patent Number: 6,150,496
[45] Date of Patent: Nov. 21, 2000

[54] INHERENTLY LIGHT-AND-HEAT-STABILIZED POLYAMIDE AND METHOD OF MAKING THE SAME

[75] Inventors: Otto M. Ilg, Asheville, N.C.; Ulrike Breiner, Burstadt; Manfred Juluis, Limbergerhof, both of Germany

[73] Assignee: BASF Corporation, Mt. Olive, N.J.

[21] Appl. No.: 09/245,275

[22] Filed: Feb. 5, 1999

Related U.S. Application Data

[60] Provisional application No. 60/074,578, Feb. 13, 1998.

[51] Int. Cl.[7] .......................... C08G 69/08; C08G 73/10; C08G 69/28
[52] U.S. Cl. .......................... 528/332; 528/310; 528/323; 528/344; 528/345; 528/347; 525/142; 525/175; 525/194; 525/327.6; 525/375; 428/395; 428/396; 442/37; 442/47; 442/58; 442/291
[58] Field of Search ..................... 528/310, 323, 528/344, 345, 347, 332; 525/142, 175, 194, 327.6, 395; 428/395, 396; 442/37, 47, 58, 291

[56] References Cited

U.S. PATENT DOCUMENTS

| | | | |
|---|---|---|---|
| 3,684,765 | 8/1972 | Matsui et al. | 260/45.8 N |
| 4,232,131 | 11/1980 | Rody et al. | 528/349 |
| 4,692,486 | 9/1987 | Gugumus | 524/100 |
| 4,918,947 | 4/1990 | Speich | 66/203 |
| 4,983,448 | 1/1991 | Karageorgiou | 428/224 |
| 5,149,758 | 9/1992 | Matthies | 528/318 |
| 5,470,921 | 11/1995 | Kaul et al. | 525/432 |
| 5,487,860 | 1/1996 | Kent et al. | 264/103 |
| 5,618,909 | 4/1997 | Lofquist et al. | 528/310 |
| 5,714,612 | 2/1998 | Kimura et al. | 546/190 |
| 5,814,107 | 9/1998 | Gadoury et al. | 8/442 |

FOREIGN PATENT DOCUMENTS

| | | | |
|---|---|---|---|
| 0345648 B1 | 9/1995 | European Pat. Off. | C08G 69/16 |
| 195 37 614 A1 | 4/1997 | Germany | C08G 69/14 |
| 2107719 | 5/1983 | United Kingdom | C08K 5/39 |
| WO 95/28443 | 4/1995 | WIPO | C08K 5/3435 |
| WO 97/05189 | 2/1997 | WIPO | C08G 69/48 |

*Primary Examiner*—P. Hampton-Hightower

[57] ABSTRACT

An inherently light- and heat-stabilized polyamide has at least one piperidine compound bonded to the backbone polymer chain and at least one 4-amino-2,2,6,6-tetramethylpiperidine compound bonded to the backbone polymer chain. The inherently light- and heat-stabilized polyamide may be used to form articles such as, for example, fibers, carpets, yarns, and textile fabrics.

33 Claims, 2 Drawing Sheets

Fig.1

INHERENTLY LIGHT-AND-HEAT-STABILIZED POLYAMIDE AND METHOD OF MAKING THE SAME

This application claims the benefit of copending U.S. Provisional Application Ser. No. 60/074,578, filed on Feb. 13, 1998.

FIELD OF THE INVENTION

This invention relates to polyamides. More particularly, this invention relates to inherently light- and heat-stabilized polyamides and to methods of making such polyamides. This invention also relates to articles produced from such polyamides.

BACKGROUND OF THE INVENTION

Polyamides tend to degrade when exposed to light and/or heat. For example, the amino end groups (i.e., the primary dye sites for acid dyes) of a polyamide are reduced during melt extrusion of the polyamide and during exposure of polyamide fibers or other polyamide articles to light and/or heat. In addition, polyamide fabrics such as, for example, carpets and textiles which have been dyed with certain classes of dyes, lose color and fade when exposed to light and/or heat.

Furthermore, the heat resistance of polyamides such as, for example, nylon 6 and nylon 6/6, is not sufficient for certain applications. For example, during the dyeing of polyamide-containing carpets, yarns, and textile fabrics and in certain heat-setting processes and end-use applications, chemical changes occur which may cause problems, e.g., oxidative/thermal damage. These problems may involve continuous filaments or staple fibers.

Stabilizers have been used to improve the heat resistance of polyamides. The stabilizers may be added before, during, or after polymerization, and even as late as the processing stage. The conventional known stabilizers are admixed with the polymer and are not bound to the polymer chain; therefore, during processing or use of the polyamide, the stabilizers can readily migrate out of the polymer, evaporate, or be washed out. This means that the activity of the stabilization is reduced in an undesired manner, and impurities are released to the surroundings (e.g., air, dye bath, etc.).

Certain copper stabilizers have also been added either during extrusion or in the dye bath to minimize polyamide degradation due to exposure to light and/or heat. This practice, however, is expensive, disturbs processing, and presents environmental problems.

U.S. patent application Ser. No. 09/041,031, filed on Mar. 11, 1998 and now pending which is assigned to BASF Corporation, relates to a process for making stabilized solution-dyed fibers by melting a polyamide comprising amide monomers polymerized in the presence of at least one hindered piperidine compound and coloring the melted polyamide with a colorant.

U.S. patent application Ser. No. 08/804,312, now issued U.S. Pat. No. 5,814,107 on Sep. 29, 1998, which is assigned to BASF Corporation, relates to a process for preparing photochemically-stable, dyed nylon compositions comprising providing to a dye bath a shaped article of poly(epsilon-caprolactam) hydrolytically polymerized in the presence of water and a hindered piperidine derivative and, in the dye bath, dyeing the shaped article with one or more metalized or nonmetalized acid dyestuffs.

A PCT application, International Application No. PCT/EP 95/01349, filed on Apr. 12, 1995 describes an inherently stabilized polyamide containing at least one triacetone diamine compound resented by the formula wherein R is hydrogen, a hydrocarbon group having 1–20 carbon atoms, or a benzyl group. The triacetone diamine compound has a primary amino group ($-NH_2$) that reacts with a carboxy end group of the polyamide molecule during polymerization, thus rendering the polymer light and heat stable. The available carboxy end groups of the polyamide determine the amount of the one or more triacetone diamine compounds that may be added.

An essay in Poly. Deg. and Stab. 21, 251–262 (1988) describes how the light stability of polyamide 6/6 is improved by adding 2,2,6,6-tetramethylpiperidin-4-ol (TMP). In a recondensation of the TMP-containing polyamide 6/6 in the melt at 275° C. under an atmosphere of water vapor, the authors of the essay claim that TMP reacts with the carboxyl end groups of the polyamides.

Although prior stabilizers are known to be considerably satisfactory, there still remain some problems to be dissolved or improved.

SUMMARY OF THE INVENTION

It has now been discovered that polyamides that are inherently stable against light and heat may be provided by polymerizing polyamide-forming monomers in the presence of (a) at least one piperidine compound represented by the formula (I):

wherein $R_1$ is hydrogen, benzyl, or a $C_1-C_{20}$ alkyl, $R_2-R_5$ are each hydrogen or the same or a different $C_1-C_6$ alkyl, X has n free valance bonding sites and is an alkyl or substituted alkyl having from about 1 to about 30 carbon atoms or an aryl or substituted aryl having from about 6 to about 20 carbon atoms, m is 0 or 1, $-C(O)-R_6$ is a group that can form an amide bond together with an amine, and n is equal to 1, 2, or 3 and (b) at least one 4-amino-2,2,6,6-tetramethylpiperidine compound represented by formula (II):

(II)

wherein $R_7$ is hydrogen, benzyl, or a $C_1$–$C_{20}$ alkyl.

Accordingly, one embodiment of the present invention is directed to an inherently light- and heat-stabilized polyamide comprising a backbone polymer chain, at least one piperidyl radical represented by formula (III):

(III)

wherein $R_1$ is hydrogen, benzyl, or a $C_1$–$C_{20}$ alkyl, $R_2$–$R_5$ are each hydrogen or the same or a different $C_1$–$C_6$ alkyl, X has n free valance bonding sites and is an alkyl or substituted alkyl having from about 1 to about 30 carbon atoms or an aryl or substituted aryl having from about 6 to about 20 carbon atoms, m is 0 or 1, and n is equal to 1, 2, or 3 and at least one 4-amino-2,2,6,6-tetramethylpiperidyl radical represented by formula (IV):

(IV)

wherein $R_7$ is hydrogen, benzyl, or a $C_1$–$C_{20}$ alkyl, wherein the one or more piperidyl radicals of formula (III) and the one or more 4-amino-2,2,6,6-tetramethylpiperidyl radicals of formula (IV) are chemically bonded to the backbone polymer chain. In the present invention, the chemical bonding of the one or more piperidyl radicals of formula (III) and the one or more 4-amino-2,2,6,6-tetramethylpiperidyl radicals of formula (IV) to the backbone polymer chain provides the polyamide with inherent, or built-in, light- and heat-stability.

In a second embodiment, the present invention is directed to a method of making an inherently light- and heat-stabilized polyamide comprising at least one piperidyl radical of formula (III):

(III)

wherein $R_1$ is hydrogen, benzyl, or a $C_1$–$C_{20}$ alkyl, $R_2$–$R_5$ are each hydrogen or the same or a different $C_1$–$C_6$ alkyl, X has n free valance bonding sites and is an alkyl or substituted alkyl having from about 1 to about 30 carbon atoms or an aryl or substituted aryl having from about 6 to about 20 carbon atoms, m is 0 or 1, and n is equal to 1, 2, or 3 and at least one 4-amino-2,2,6,6-tetramethylpiperidyl radical of formula (IV):

(IV)

wherein $R_7$ is hydrogen, benzyl, or a $C_1$–$C_{20}$ alkyl, wherein the radicals of formulae (III) and (IV) are chemically bonded to the backbone polymer chain, the method comprising subjecting polyamide-forming monomers to a polymerization process in the presence of an effective amount of at least one piperidine compound of formula (I):

(I)

wherein $R_1$ is hydrogen, benzyl, or a $C_1$–$C_{20}$ alkyl, $R_2$–$R_5$ are each hydrogen or the same or a different $C_1$–$C_6$ alkyl, X has n free valance bonding sites and is an alkyl or substituted alkyl having from about 1 to about 30 carbon atoms or an aryl or substituted aryl having from about 6 to about 20 carbon atoms, m is 0 or 1, —C(O)—$R_6$ is a group that can form an amide bond together with an amine, and n is equal to 1, 2, or 3 and an effective amount of at least one 4-amino-2,2,6,6-tetramethylpiperidine compound of formula (II):

(II)

wherein $R_7$ is hydrogen, benzyl, or a $C_1$–$C_{20}$ alkyl.

In yet another embodiment, the present invention is directed to polyamide fibers formed from the inherently light- and heat-stabilized polyamides of the present invention.

Thus, it is a primary object of the present invention to provide a light- and heat-stabilized polyamide wherein the stabilizing components are chemically bonded to the polyamide.

Another object of the present invention is to provide a method of making a light- and heat-stabilized polyamide wherein the stabilizing components are chemically bonded to the polyamide.

A further object of the present invention is to provide polyamide fibers formed from making a light- and heat-stabilized polyamide, wherein the stabilizing components are chemically bonded to the polyamide.

The above and other objects, effects, features, and advantages of the present invention will become more apparent from the following detailed description of the preferred embodiments thereof, particularly when viewed in conjunction with the accompanying figures.

DETAILED DESCRIPTION OF THE PREFERRED EMBODIMENTS

To promote an understanding of the principles of the present invention, descriptions of specific embodiments of the invention follow, and specific language is used to describe the same. It will nevertheless be understood that no limitation of the scope of the invention is intended by the use of this specific language and that alterations, modifications, equivalents, and further applications of the principles of the invention discussed are contemplated as would normally occur to one of ordinary skill in the art to which the invention pertains.

As used herein with respect to the polyamides of this invention, the term "inherently light- and heat-stabilized" means that the light- and heat-stability are built into the polyamide. In other words, the components that render the polyamide light- and heat-stabilized are chemically bonded to the backbone polymer chain of the polyamide rather than merely physically admixed with the polyamide.

As used herein with respect to the polyamides of this invention, the phrase "both end groups that are terminated and stabilized" refers to the result that occurs when the piperidyl radical of formula (III) and the 4-amino-2,2,6,6-tetramethylpiperidine radical of formula (IV) chemically bond to the backbone polymer chain of the inherently light- and heat-stabilized polymers.

In one embodiment, the present invention is an inherently light- and heat-stabilized polyamide comprising at least one piperidyl radical represented by formula (III):

(III)

wherein $R_1$ is hydrogen, benzyl, or a $C_1$–$C_{20}$, preferably a $C_2$–$C_4$, alkyl, $R_2$–$R_5$ are each hydrogen or the same or a different $C_1$–$C_6$ alkyl, X has n free valance bonding sites and is an alkyl or substituted alkyl having from about 1 to about 30 carbon atoms or an aryl or substituted aryl having from about 6 to about 20 carbon atoms, m is 0 or 1, and n is equal to 1, 2, or 3 and at least one 4-amino-2,2,6,6-tetramethylpiperidyl radical represented by formula (IV):

(IV)

wherein $R_7$ is hydrogen, benzyl, or a $C_1$–$C_{20}$, preferably $C_1$–$C_{18}$ and more preferably $C_2$–$C_4$, alkyl, wherein the at least one piperidyl radical of formula (III) and the at least one 4-amino-2,2,6,6-tetramethylpiperidyl radical of formula (IV) are chemically bonded to the backbone polymer chain of the inherently light- and heat-stabilized polyamide.

The inherently light- and heat-stabilized polyamide of the present invention is obtained by subjecting polyamide-forming monomers to a polymerization process in the presence of (a) an effective amount of at least one piperidine compound represented by formula (I):

(I)

wherein $R_1$ is hydrogen, benzyl, or a $C_1$–$C_{20}$, preferably a $C_2$–$C_4$, alkyl, $R_2$–$R_5$ are each hydrogen or the same or a different $C_1$–$C_6$ alkyl, X has n free valance bonding sites and is an alkyl or substituted alkyl having from about 1 to about 30 carbon atoms or an aryl or substituted aryl having from about 6 to about 20 carbon atoms, m is 0 or 1, —C(O)—$R_6$ is a group that can form an amide bond together with an amine, and n is equal to 1, 2, or 3 and (b) an effective amount of at least one 4-amino-2,2,6,6,-tetramethylpiperidine compound represented by formula (II):

(II)

wherein $R_7$ is hydrogen, benzyl, or a $C_1$–$C_{20}$ alkyl. Preferably, $R_7$ is a $C_1$–Cis alkyl and more preferably a $C_2$–$C_4$ alkyl.

In formula (I), —C(O)—$R_6$ represents a group that can form an amide bond together with an amine such as, for example, carboxylic acid, alkyl ester, aryl ester, amide, and anhydride. Thus, $R_6$ may be selected from the group consisting of hydroxyl; —$OR_8$ where $R_8$ is a $C_1$–$C_{30}$ alkyl or a $C_6$–$C_{20}$ aryl; —$NHR_9$ where $R_9$ is hydrogen, a $C_1$–$C_{30}$ alkyl, or a $C_6$–$C_{20}$ aryl; —$NR_{10}R_{11}$ where $R_{10}$ and $R_{11}$ are each the same or a different $C_1$–$C_{30}$ alkyl or $C_6$–$C_{20}$ aryl; and —$OCOR_{12}$ where $R_{12}$ is a $C_1$–$C_{30}$ alkyl or a $C_6$–$C_{20}$ aryl. Most preferably, $R_6$ is hydroxyl.

With respect to the anhydride (i.e., where $R_6$ is —$OCOR_{12}$), it may be a symmetrical anhydride (i.e., $R_{12}$ and the piperidine compound of formula (I) are identical) or an asymmetrical anhydride (i.e., $R_{12}$ and the piperidine compound of formula (I) are different). A preferred anhydride is 4-carboxy-2,2,6,6-tetramethylpiperidine anhydride represented by formula (VI):

(VI)

As noted above, X is an alkyl having from about 1 to about 30 carbon atoms or an aryl having from about 6 to about 20 carbon atoms. Alternatively, X may also be a substituted alkyl having a $C_1$–$C_{30}$ alkyl backbone wherein one or more of the hydrogen atoms is substituted with dialkyl amine, alkoxy, chlorine, or fluorine. Alternatively, X may also be a substituted aryl having a $C_6$–$C_{24}$ aryl backbone wherein one or more of the hydrogen atoms is substituted with dialkyl amine, alkoxy, chlorine, fluorine, or a $C_1$–$C_{30}$ alkyl. Preferably, X is selected from the group consisting of $C_1$–$C_4$ alkyl, methylene, ethylene, and, if n is 2, —CH.

The preferred piperidine compound of formula (I) is 4-carboxy-2,2,6,6-tetramethylpiperidine (also referred to as "carboxy-TAD").

The polymerization process by which the polyamide of the present invention is formed is preferably carried out according to conventional processes such as, for example, those described in U.S. Pat. No. 5,149,758 to Matthies, the entirety of which is herein incorporated by reference, but with the addition of an effective amount of one or more piperidine compounds of formula (I) and an effective amount of one or more 4-amino-2,2,6,6-tetramethylpiperidine compound of formula (II). An effective amount of at least one piperidine compound of formula (I) is an amount sufficient in combination with the one or more 4-amino-2,2,6,6-tetramethylpiperidine compounds of formula (II) to render the resultant polyamide inherently light- and heat-stable. Preferably, the effective amount of the one or more piperidine compounds of formula (I) is in the range of about 0.01 to about 0.70, and more preferably about 0.08 to about 0.50, weight percent based on the weight of the polyamide-forming monomers used. An effective amount of at least one 4-amino-2,2,6,6-tetramethylpiperidine compound of formula (II) is an amount sufficient in combination with the one or more piperidine compounds of formula (D to render the resultant polyamide inherently light- and heat-stable. Preferably, the effective amount of the one or more 4-amino-2,2,6,6-tetramethylpiperidine compounds of formula (II) is in the range of about 0.01 to about 0.70, and more preferably about 0.08 to about 0.50, weight percent based on the weight of the polyamide-forming monomers used.

The one or more piperidine compounds of formula (I) may be added to the polyamide-forming compounds or to the polymerizing reaction mixture. Thus, the one or more piperidine compounds of formula (I) and the polyamide-forming monomers may be added separately or as a mixture to a reactor in which polymerization is effected.

Via the carboxy groups(s) thereof, the one or more piperidine compounds of formula (I) react with the polyamide-forming monomers or with the amine groups of the resulting polyamide such that the one or more piperidyl radicals of formula (III) becomes chemically bonded to the backbone polymer chain of the polyamide. The chemical bonding of the piperidyl radicals of formula (III) to the backbone polymer chain of the polyamide provides the polyamide with the inherent light- and heat-stability.

The one or more 4-amino-2,2,6,6-tetramethylpiperidine compounds of formula (II) also chemically bond to an end of the backbone polymer chain of the polyamide of the present invention through reaction of the primary amino groups of the one or more 4-amino-2,2,6,6-tetramethylpiperidine compounds of formula (II) with the polyamide-forming monomers themselves or with the carboxyl groups of the resulting polyamide.

The resulting polyamide, therefore, will contain one or more piperidyl radicals of formula (III):

(III)

wherein $R_1$ is hydrogen, benzyl, or a $C_1$–$C_{20}$, preferably a $C_2$ to $C_4$, alkyl, $R_2$–$R_5$ are each hydrogen or the same or a different $C_1$–$C_6$ alkyl, X has n free valance bonding sites and is an alkyl or substituted alkyl having from about 1 to about 30 carbon atoms or an aryl or substituted aryl having from about 6 to about 20 carbon atoms, m is 0 or 1, and n is equal to 1, 2, or 3 and one or more 4-amino-2,2,6,6-tetramethylpiperidyl radicals of formula (IV):

(IV)

wherein $R_7$ is hydrogen, benzyl, or a $C_1$–$C_{20}$ alkyl. Preferably, $R_7$ is a $C_1$–$C_{18}$ alkyl and more preferably a $C_2$–$C_4$ alkyl.

The presence of the one or more 4-amino-2,2,6,6-tetramethylpiperidine compounds of formula (II) during the polymerization of the polyamide-forming monomers further enhances the light- and heat-stability of the polyamide of the present invention. Because of stearic hindrance, it is believed that the secondary amino groups of the one or more 4-amino-2,2,6,6-tetramethylpiperidine compounds of formula (II) do not react with the polyamide-forming monomers or the resulting polyamide. Thus, the one or more 4-amino-2,2,6,6-tetramethylpiperidine compounds of formula (II) may also function as a chain regulator.

The one or more 4-amino-2,2,6,6-tetramethylpiperidine compounds of formula (II) may be added to the polyamide-forming monomers or to the polymerizing reaction mixture. Preferably, the one or more 4-amino-2,2,6,6-tetramethylpiperidine compounds of formula (II) is added in an amount of from about 0.03 to about 0.80, more preferably from about 0.06 to about 0.40, mole percent, each in relation to one mole of amide groups in the polyamide.

Any suitable polyamide-forming monomers may be used to form the inherently light- and heat-stabilized polyamide of the present invention. Examples of such suitable polyamide-forming monomers are diamine compounds, dicarboxylic acids, caprolactam monomers, and combinations thereof.

According to one embodiment of the method of the present invention, the polyamide-forming monomers are composed of at least one diamine compound and at least one dicarboxylic acid. Preferred diamine compounds are hexamethylenediamine and tetramethylenediamine. Preferred dicarboxylic acids include adipic acid, sebacic acid, and terephthalic acid. Adipic acid and terephthalic acid are most preferred. Alternatively, the polyamide-forming monomers may be composed of dicarboxylic acid diamine salts.

According to another embodiment of the method of the present invention, the polyamide-forming monomers are composed of caprolactam monomers, which polymerize to form nylon 6.

In preferred embodiments of the present invention, the inherently light- and heat-stabilized polyamide of this invention is nylon 6, nylon 6/6, nylon 4/6, nylon 6/10, or aromatic nylons such as, for example, poly(meta-phenylene isophthalamide) and poly(para-phenylene terephthalamide), which are disclosed in U.S. Pat. No. 3,287,324 to Sweeny and U.S. Pat. No. 3,671,542 to Kwoleck, both of which are incorporated herein by reference.

In a more preferred embodiment of the method of the present invention, the one or more piperidine compounds of formula (I) and the one or more 4-amino-2,2,6,6-tetramethylpiperidine compounds of formula (II) are combined with an effective amount of at least one conventional chain regulator. The carboxy group(s) of the chain regulator(s) react at the amino end groups of the polyamide chain, while the amino group(s) of amine chain regulator(s) react at the carboxylic end groups of the polyamide chain. Thus, the chain regulator(s) acts as a molecular weight controller.

The particular chain regulator, or combination of chain regulators, and the amount thereof are selected according to the desired amino end group content of the final polyamide product and according to the desired melt stability of the final polyamide product. The desired amino end group content of the final polyamide product will depend on the desired dyeability of the yarns or fibers produced from such polyamide product. The desired melt stability of the final polyamide product will depend on the practical requirements for the processing of the polyamide, particularly for the spinning of the polyamide.

Suitable chain regulators for use in the present invention include, for example, monocarboxylic acids, dicarboxylic acids, amines, diamines, and combinations thereof. Non-limiting examples of suitable monocarboxylic acids include acetic acid, propionic acid, and benzoic acid. Non-limiting examples of suitable dicarboxylic acids include $C_4$–$C_{10}$ alkane dicarboxylic acids, particularly adipic acid, azelaic acid, sebacic acid, decanedicarboxylic acid, and dodecanedioic acid; $C_5$–$C_8$ cycloalkane dicarboxylic acids, particularly cyclohexane-1,4-dicarboxylic acid; and benzoic dicarboxylic acids, particularly isophthalic acid, terephthalic acid, and naphthalene-2,6-dicarboxylic acid. Non-limiting examples of suitable amines include hexylamine, cyclohexylamine, octylamine, benzylamine, and 2-phenylethylamine. Non-limiting examples of suitable diamines include $C_2$–$C_{18}$ alkane diamines, particularly tetramethylene diamine, hexamethylene diamine, and dodecane diamine; $C_5$–$C_8$ cycloalkane diamines; and $C_6$–$C_{24}$ aryl diamines, particularly para-phenylene diamine, meta-phenylene diamine, meta-xylylene diamine, and para-xylylene diamine. The chain regulator(s) is preferably used in an amount of from about 0.06 to about 0.60, more preferably from about 0.10 to about 0.50, mole percent, each in relation to one mole of amide groups in the polyamide.

Preferably, the chain regulator(s) used in the present invention is one or more dicarboxylic acids or one or more diamines. The dicarboxylic acid or diamine chain regulator(s) may be the same as or different from a dicarboxylic acid or diamine that is used as a polyamide-forming compound.

In another embodiment of the present invention, the method of polymerization of polyamide-forming monomers in the presence of one or more piperidine compounds of formula (I) and one or more 4-amino-2,2,6,6-tetramethylpiperidine compounds of formula (II) is also carried out in the presence of one or more pigments. Suitable pigments for use in the present invention include, for example, titanium dioxide and color-bearing compounds of organic or inorganic nature. The pigment(s) is preferably added to the polyamide-forming monomers or to the polymerizing mixture in an amount of from about to about 5, more preferably from about 0.02 to about 2, parts by weight per 100 parts by weight of the polyamide product.

Most preferably, the method of the present invention comprises subjecting polyamide-forming monomers to polymerization in the presence of one or more piperidine compounds of formula (I), one or more 4-amino-2,2,6,6-tetramethylpiperidine compounds of formula (II), and one or more chain regulators and/or pigments.

The present invention is further directed to articles produced from the inherently light- and heat-stabilized polyamides and to methods of producing such articles. Non-limiting examples of such articles include fibers, yarns, carpets, textile fabrics, and the like. Fibers may be formed by subjecting the inherently light- and heat-stabilized polyamides of the present invention to any conventional fiber-forming process such as, for example, that disclosed in U.S. Pat. No. 4,983,448 to Karageorgiou and U.S. Pat. No. 5,487,860 to Kent et al., the entirety of both of which are incorporated herein by reference. Preferably, the fiber-forming process involves rapidly spinning the inherently light- and heat-stabilized polyamide at take-off speeds of at least about 4,000 m/min.

Similarly, fabrics may be formed by subjecting the inherently light- and heat-stabilized polyamides of the present invention to any conventional fabric-forming process such as, for example, that disclosed in U.S. Pat. No. 4,918,947 to Speich, the entirety of which is incorporated herein by reference.

The articles formed from the inherently light- and heat-stabilized polyamides of the present invention may be dyed with conventional dyes used to dye nylons such as, for example, metalized and non-metalized acid dyes. Usual dyebath conditions for dyeing nylon can be employed. The following general conditions are exemplary and not intended to be limiting. A dyebath is prepared at a volume equal to about 20 times the weight of the articles to be dyed. Processing chemicals are added including a chelating agent to prevent the deposition or complexing of metal ions in hard water, a dye leveling agent, and, in the case of metalized acid dyes, an acid donor to slowly lower the dyebath pH. The dyestuff is added, and the dyebath pH is adjusted. The solution is heated to the desired temperature of typically about from 95° C. to about 110° C. at a rate of from about 0.5° C. to about 3.0° C. per minute and is held at that temperature for about 30 minutes to about 60 minutes. The dyebath is cooled or emptied, and the articles are thoroughly rinsed with fresh water. The dyed articles are dried in a tumble drier or an oven such as a Tenter or are passed over heater cans. The dyed articles may then be optionally heatset to improve dimensional stability.

Alternatively, fibers made from the inherently light- and heat-stabilized polyamides of the present invention may be solution-dyed before being formed into articles. Usual conditions for solution-dyeing nylon can be employed. The following general conditions are exemplary and not intended to be limiting. The polyamide of the present invention is melted and colored with a colorant selected from the group consisting of pigments, dyes, any colored compound with properties between pigments and dyes, and combinations thereof. The colored polyamide is then spun into fibers or fabric according to conventional methods such as, for example, those disclosed in U.S. Pat. No. 4,983,448 to Karageorgiou, U.S. Pat. No. 5,487,860 to Kent et al., and U.S. Pat. No. 4,918,947 to Speich.

The present invention will be further described by reference to the following detailed examples. The examples are set forth by way of illustration and are not intended to limit the scope of the invention. As used in the examples, the following terms and test procedures are defined as follows:

Weight Percent.

The weight percentage of that component in the charge.

Relative Viscosity (RV).

The relative viscosity compares the viscosity of a solution of polymer in formic acid with the viscosity of the formic acid itself (ASTM D 789). The test results reported herein were obtained using 0.20 g of nylon 6 dissolved in 20 cc. of formic acid at 25° C.

Color Measurements.

Color measurements are made using an Applied Color Systems ("ACS") Spectrophotometer generating 1976 CIE LAB (D6500 illuminant, 10 degree observer) values. Total color difference (or Delta E, wherein higher Delta E values indicate more color change) calculations are made against unexposed controls. Details of CIE LAB measurements and the calculation of total color difference (Delta E) are found in color science literature such as, for example, Billmeyer and M. Saltzman, *Principles of Color Technology*, 2nd edition.

End Group Content.

The amino end group content is determined by dissolving about 2.0 g of nylon 6 in about 60 cc. of a phenol-methanol mixture (68:32). This solution is titrated with about 0.20 normal HCl at about 25° C. by a potentiometric method, wherein the endpoint is determined by a steep potential increase.

The carboxy end group content is determined by dissolving about 0.30 g of nylon 6 in about 40 cc. of a mixture of benzyl alcohol at 180° C. The solution is titrated with about 0.03 normal t-butyl ammonium hydroxide at about 80° C. to about 100° C. by a potentiometric method, wherein the endpoint is determined by a steep potential increase.

EXAMPLE 1 (Control I)

Polymer Containing No Stabilizers

In a polymerization of a nylon 6 polymer (RV 2.4), 4 kg caprolactam, 400 g water, 6.0 g (0.15 weight percent) of propionic acid are charged into a 11-liter autoclave. The mixture is heated to about 260° C. in one hour, while the pressure increases to about 60 psi (3,102 mm Hg). After holding the mixture at about 60 psi (3,102 mm Hg) for about 30 minutes, the pressure is slowly released. To accelerate polymerization, the system is placed under a vacuum of 300 mbar over the last 15 minutes. The polymer is then extruded under a positive nitrogen pressure and cut into chips. The chips are washed 6 times with 6 L of hot water (about 100° C.) and dried under nitrogen. The polymer is postcondensed at 160° C. to increase the viscosity to 2.7. The amino end group content measures about 33 meq/kg, and the carboxylic end group content measures about 50 meq/kg.

EXAMPLE 2 (Control II)

Polymer Containing TAD Stabilizer

In a polymerization of a nylon 6 polymer (RV 2.4), 4 kg caprolactam, 400 g water, 22.8 g (0.57 weight percent) of terephthalic acid, 10.8 g (0.27 weight percent) of 4-amino-2,2,6,6-tetramethylpiperidine are charged into a 11-liter autoclave. The mixture is heated to about 260° C. in one hour, while the pressure increases to about 60 psi (3,102 mm Hg). After holding the mixture at about 60 psi (3,102 mm Hg) for about 30 minutes, the pressure is slowly released. To accelerate polymerization, the system is placed under a vacuum of 300 mbar over the last 15 minutes. The polymer is then extruded under a positive nitrogen pressure and cut into chips. The chips are washed 6 times with 6 L of hot water (about 100° C.) and dried under nitrogen. The polymer is postcondensed at 160° C. to increase the viscosity to 2.4. The amino end group content measures about 35 meq/kg, and the carboxylic end group content measures about 71 meq/kg.

EXAMPLE 3

Polymer Containing TAD and Carboxy-TAD Stabilizers

In a polymerization of a nylon 6 polymer (RV 2.4), 4 kg caprolactam, 400 g water, 22.8 g (0.57 weight percent) of terephthalic acid, 10.8 g (0.27 weight percent) of 4-amino-2,2,6,6-tetramethylpiperidine, and 12.8 g (0.32 weight percent) of 4-carboxy-2,2,6,6-tetramethylpiperidine are charged into a 11-liter autoclave. The mixture is heated to about 260° C. in one hour, while the pressure increases to about 60 psi (3,102 mm Hg). After holding the mixture at about 60 psi (3,102 mm Hg) for about 30 minutes, the pressure is slowly released. To accelerate polymerization, the system is placed under a vacuum of 300 mbar over the last 15 minutes. The polymer is then extruded under a positive nitrogen pressure and cut into chips. The chips are washed 6 times with 6 L of hot water (about 100° C.) and dried under nitrogen. The polymer is postcondensed at 160° C. to increase the viscosity to 2.4. The amino end group content measures about 36 meq/kg, and the carboxylic end group content measures about 89 meq/kg.

EXAMPLE 4

Polymer Containing TAD and Carboxy-TAD Stabilizers

In a polymerization of a nylon 6 polymer (RV 2.4), 75 kg caprolactam, 1800 g water, 412.5 g (0.55 weight percent) of terephthalic acid, 202.5 g (0.27 weight percent) of 4-amino-2,2,6,6-tetramethylpiperidine, and 75 g (0.10 weight percent) of 4-carboxy-2,2,6,6-tetramethylpiperidine are charged into a 250-liter autoclave. The mixture is heated to about 270° C. in one hour, while the pressure increases to about 60 psi (3,102 mm Hg). After holding the mixture at about 60 psi (3,102 mm Hg) for about 30 minutes, the pressure is slowly released. To accelerate polymerization, the system is placed under a vacuum of 500 mm Hg for less than 5 minutes. The polymer is then extruded under a positive nitrogen pressure and cut into chips. The chips are washed with hot water (about 90° C.) and dried in a tumble dryer. The amino end group content measures about 41 meq/kg, and the carboxylic end group content measures about 78 meq/kg.

EXAMPLE 5

Polymer Containing TAD and Carboxy-TAD Stabilizers with Titanium Dioxide

In a polymerization of a nylon 6 polymer (RV 2.4), 74 kg caprolactam, 1800 g water, 412.5 g (0.55 weight percent) of terephthalic acid, 202.5 g (0.27 weight percent) of 4-amino-2,2,6,6-tetramethylpiperidine, 75 g (0.10 weight percent) of 4-carboxy-2,2,6,6-tetramethylpiperidine, and 750 g (0.30 weight percent) of a nylon-6 master batch containing about 30 percent titanium dioxide are charged into a 250-liter autoclave. The mixture is heated to about 270° C. in one hour, while the pressure increases to about 60 psi (3,102 mm Hg). After holding the mixture at about 60 psi (3,102 mm Hg) for about 30 minutes, the pressure is slowly released. To accelerate polymerization, the system is placed under a vacuum of 500 mm Hg for less than 5 minutes. The polymer is then extruded under a positive nitrogen pressure and cut into chips. The chips are washed with hot water (about 90° C.) and dried in a tumble dryer. The amino end group content measures about 41 meq/kg, and the carboxylic end group content measures about 78 meq/kg.

EXAMPLE 6

Polymer Containing TAD and Carboxy-TAD Stabilizers

In a polymerization of a nylon-6 polymer (RV 2.7), 75 kg caprolactam, 1800 g water, 225 g (0.30 weight percent) of terephthalic acid, 112.5 g (0.15 weight percent) of 4-amino-2,2,6,6-tetramethylpiperidine, and 75 g (0.10 weight percent) of 4-carboxy-2,2,6,6-tetramethylpiperidine are charged into a 250-liter autoclave. The mixture is heated to about 270° C. in one hour, while the pressure increases to about 60 psi (3,102 mm Hg). After holding the mixture at about 60 psi (3,102 mm Hg) for about 30 minutes, the pressure is slowly released. To accelerate polymerization, the system is placed under a vacuum of 500 mm Hg for 30 minutes. The polymer is then extruded under a positive nitrogen pressure and cut into chips. The chips are washed with hot water (about 90° C.) and dried in a tumble dryer. The amino end group content measures about 41 meq/kg, and the carboxylic end group content measures about 65 meq/kg.

EXAMPLE 7

Spinning of Bright 40 Denier/12 Filament Yarn

The resulting nylon 6 polymers of Examples 1 through 3 are each extruded at 265–275° C. The extruded filaments are cooled and solidified by a stream of quench air at 15° C. The filaments are lubricated with spin finish below the quench cabinet and are air interlaced to improve filament cohesion. Yarns are taken up on a winder at speeds greater than about 1300 m/min. The yarns are drawn prior winding, and the draw ratio varies from about 3.0 to about 3.3.

EXAMPLE 8

Yellowing of Scoured Knitted Tubes

Figure 1:
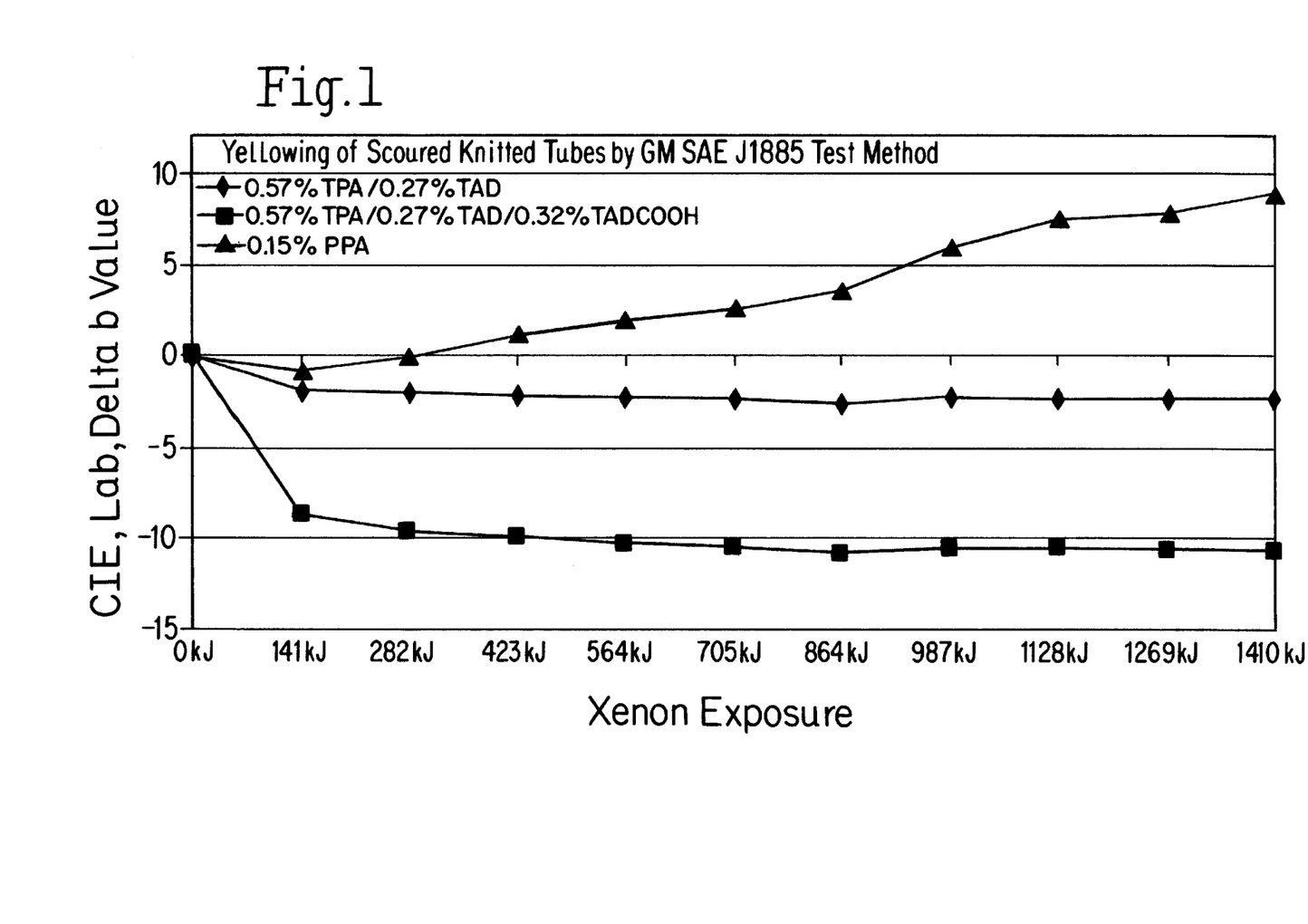
FIG. 1 is a graph illustrating the yellowing of scoured knitted tubes after exposure in a weatherometer for 700 hours.

The yarns (made in Example 7) from the polymers of Examples 1 through 3 are knitted into tubes. These three knitted tubes are scoured in a 20:1 bath at 1.0 percent on weight of fabric (hereinafter "owf") Kierlon NB-OL® (an anionic scouring agent available from BASF Corporation of Mount Olive, N.J.) and 1.0 percent owf tetrasodium pyrophosphate to remove spin finish and are rinsed and dried. The three knitted tubes are then exposed in an Atlas Ci65 Xenon-Arc Weather-Ometer® for 700 hours (987 kJ) in 100 hour (141 kJ) increments by the conditions specified in the GM SAE J1885 Test Method. The exposed tubes are measured at each increment of exposure for yellowing on an ACS Spectrophotometer. The Delta b* values are a measure of yellowing. A higher Delta b* value indicates a more yellow sample. The results of these exposures, which are plotted in FIG. 1, show that the tubes spun from 0.15 weight percent propionic acid (control I) and 0.57 weight percent terephthalic acid /0.27 weight percent 4-amino-2,2,6,6-tetramethylpiperidine (control II) yellow significantly more than the tubes spun from 0.57 weight percent terephthalic acid/0.27 weight percent 4-amino-2,2,6,6-tetramethylpiperidine/0.32 weight percent 4-carboxy-2,2,6,6-tetramethylpiperidine (invention).

EXAMPLE 9

Heat Aging of Yarns

Another set of knitted tubes made in accordance with Example 8 are exposed in a forced air heated oven at 170° C. for about 23 minutes to determine the relative yellowing between the different yarns when exposed to this extreme condition. After this heat exposure, the samples are measured for yellowing on the ACS Spectrophotometer, and their color difference relative to an unexposed control is determined. These Delta b* values are given in Table 1 below (each Delta b* value in Table I is the average of two readings per sample from two samples for each condition). The results in Table 1 show that the tube spun from 0.57 weight percent terephthalic acid/0.27 weight percent 4-amino-2,2,6,6-tetramethylpiperidine/0.32 weight percent 4-carboxy-2,2,6,6-tetramethylpiperidine (invention) yellows less than the tubes spun from the other polymers (control I and control II).

TABLE 1

Heat Aging (Yellowing) of Scoured/Knitted Yarns

| Sample | Delta b* Value |
| --- | --- |
| 0.15 weight percent propionic acid (Example 1) | 8.0 |
| 0.57 weight percent terephthalic acid/0.27 weight percent 4-amino-2,2,6,6-tetramethylpiperidine (Example 2) | 7.3 |
| 0.57 weight percent terephthalic acid/0.27 weight percent 4-amino-2,2,6,6-tetramethylpiperidine/0.32 weight percent 4-carboxy-2,2,6,6-tetramethylpiperidine (Example 3) | 2.6 |

EXAMPLE 10

Strength Retention

Three more sets of knitted tubes made in accordance with Example 8 are dyed in separate equivalent dyebaths in typical automotive headliner shades of green, gray, and burgundy. The dyeings are done in a 30:1 dye liquor ratio using the following: 0.5 percent owf Supralev AC® (a dyeing assistant and leveler available from Rhone-Poulenc, Inc. of Lawrenceville, Ga.), 1.0 percent owf Sandogen NH® (a dye leveling agent available from Clariant Corporation of Charlotte, N.C.), and 0.5 percent owf Amquest LDS® (a dye solubilizer available from American Emulsions Company of Dalton, Ga.). The dyebaths are adjusted to a pH of 6.5 with acetic acid and heated to 95° C. at 1° C. per minute. The dyebaths are run for about 45 minutes at 95° C. after which they are cooled, and the dyed samples are rinsed and dried. The following dyes are used to formulate the dye shades: Intralan® Yellow GRL 200 percent, Intralan® Bordeaux RLB 200 percent, and Intralan® Bordeaux EL 200 percent, Irgalan® Yellow 2GL 250 percent, Irgalan® Yellow 3RL, Irgalan® Yellow GRL 200 percent, Irgalan® Black RBL 200 percent, Irgalan® Blue 3GL 200 percent, Irgalan® Red Brown RL 200 percent and Irgalan® Grey GL 200 percent all available from Ciba Specialty Chemicals Corporation of High Point, N.C., and Lanasyn® Yellow LNW available from Clariant Corporation.

Figure 2:
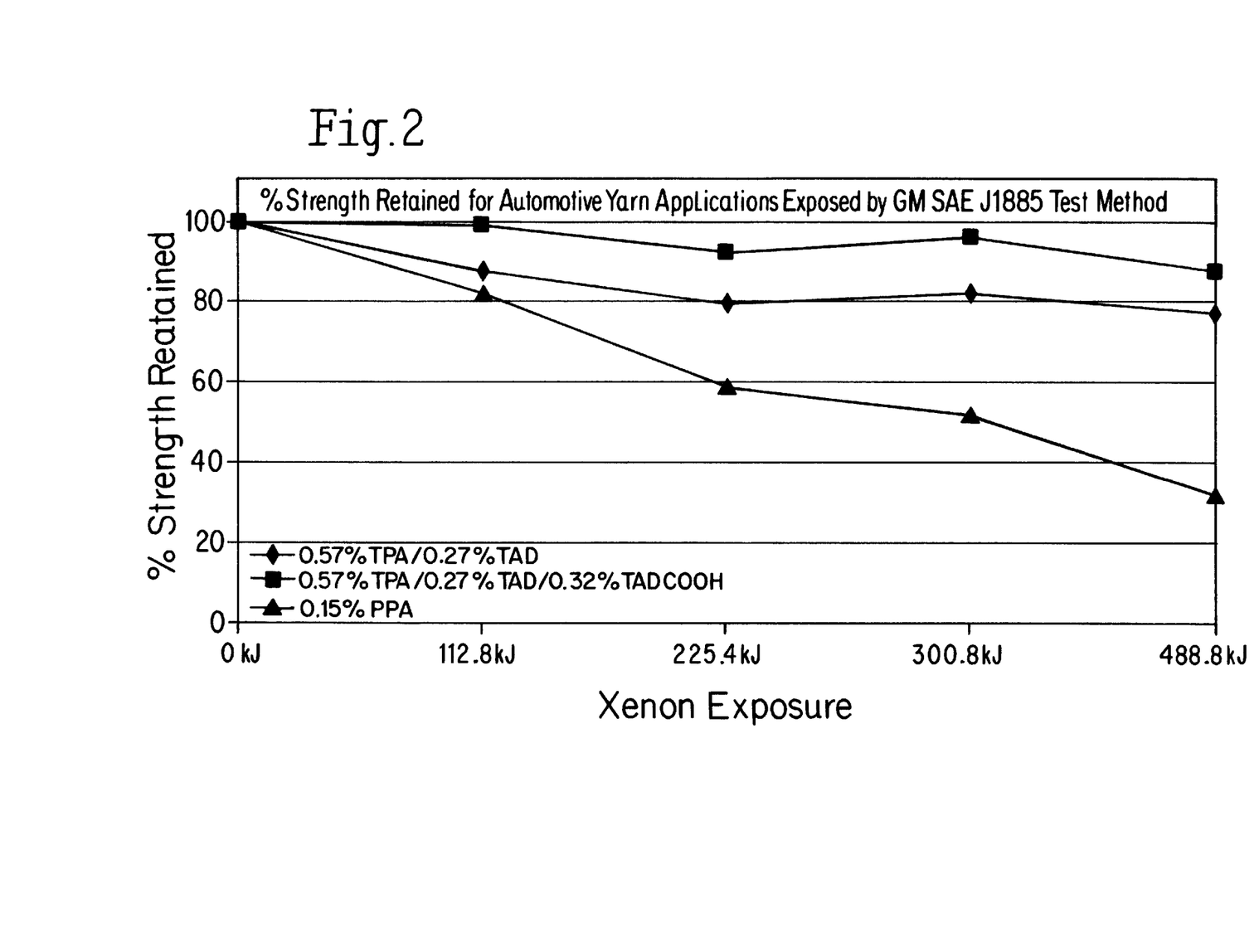
FIG. 2 is a graph illustrating the percent strength retained for solution-dyed yarns after exposure in a weatherometer.

After dyeing, the samples are tested for automotive dye lightfastness by exposure in an Atlas Ci65 Xenon-Arc Weather-Ometer® for 112.8 kJ, 225.6, 300.8 and 488.8 kJ by the conditions specified in the GM SAE J1885 Test Method. The strength of the yarns raveled from the knitted tubes, as well as the strength retention of an original dyed, non-exposed sample, is measured before exposure and after each increment of exposure. These results are shown in FIG. 2. The results indicate that, for each of the dyed shades, the sample with 0.57 weight percent terephthalic acid/0.27 weight percent 4-amino-2,2,6,6-tetramethylpiperidine/0.32 weight percent 4-carboxy-2,2,6,6-tetramethylpiperidine (invention) has less strength loss than the controls (0.15 weight percent propionic acid and 0.57 weight percent terephthalic acid/0.27 weight percent 4-amino-2,2,6,6-tetramethylpiperidine).

While the invention has been described in connection with what is presently considered to be the most practical and preferred embodiment, it is to be understood that the invention is not to be limited to the disclosed embodiment, but on the contrary, is intended to cover various modifications and equivalents arrangements included within the spirit and scope of the appended claims.

What is claimed is:

1. A method of making an inherently light- and heat-stabilized polyamide comprising subjecting polyamide-forming monomers to a polymerization process in the presence of (a) an effective amount of at least one piperidine compound represented by formula (I):

wherein $R_1$ is hydrogen, benzyl, or a $C_1$–$C_{20}$ alky, $R_2$–$R_5$ are each hydrogen or the same or a different $C_1$–$C_6$ alkyl, X has n free valance bonding sites and is an alkyl or substituted alkyl having from about 1 to about 30 carbon atoms or an aryl or substituted aryl having from about 6 to about 20 carbon atoms, m is 0 or 1, —C(O)—$R_6$ is a group that forms an amide bond together with an amine, and n is equal to 1, 2, or 3 and (b) an effective amount of at least one 4-amino-2,2,6,6-tetramethylpiperidine compound represented by formula (II):

wherein $R_7$ is hydrogen, benzyl, or a $C_1$–$C_{20}$ alkyl.

2. The method of claim 1 wherein $R_1$ and $R_7$ are hydrogen, $R_2$–$R_5$ are each a methyl group, $R_6$ is a hydroxyl group, m is 0, and n is 1.

3. The method of claim 1 wherein $R_1$ and $R_7$ are hydrogen, $R_2$–$R_5$ are each a methyl group, $R_6$ is a hydroxyl group, m is 1, n is 1, and X is selected from the group consisting of $C_1$–$C_4$ alkyl, methylene, and ethylene.

4. The method of claim 3 wherein X is $CH_2$.

5. The method of claim 1 wherein the polyamide-forming monomers comprise caprolactam monomers.

6. The method of claim 1 wherein the polyamide-forming monomers comprise at least one diamine compound and at least one dicarboxylic acid.

7. The method of claim 6 wherein the at least one diamine compound is selected from the group consisting of hexamethylenediamine and tetramethylenediamine and the at least one dicarboxylic acid is selected from the group consisting of adipic acid, sebacic acid, and terephthalic acid.

8. The method of claim 1 wherein the polyamide-forming monomers comprise dicarboxylic acid diamine salts.

9. The method of claim 1 wherein the polymerization process is further performed in the presence of at least one chain-regulating compound other than the compounds represented by formulae (I) and (II).

10. The method of claim 9 wherein the at least one chain-regulating compound is selected from the group consisting of monocarboxylic acids, dicarboxylic acids, amines, diamines, and combinations thereof.

11. The method of claim 10 wherein the at least one chain-regulating compound is dicarboxylic acid.

12. The method of claim 11 wherein said dicarboxylic acid is selected from the group consisting of $C_4$–$C_{10}$ alkane dicarboxylic acids, $C_5$–$C_8$ cycloalkane dicarboxylic acids, benzoic dicarboxylic acids, and combinations thereof.

13. The method of claim 12 wherein said dicarboxylic acid is selected from the group consisting of adipic acid, terephthalic acid, sebacic acid, decanedicarboxylic acid, isophthalic acid, and combinations thereof.

14. The method of claim 10 wherein the at least one chain-regulating compound is diamine.

15. The method of claim 14 wherein said diamine is selected from the group consisting of $C_2$–$C_{18}$ alkane diamines, $C_5$–$C_8$ cycloalkane diamines, $C_6$–$C_{24}$ aryl diamines, and combinations thereof.

16. The method of claim 1 wherein the polymerization process is further performed in the presence of at least one pigment.

17. The method of claim 1 wherein the inherently light- and heat-stabilized polyamide is selected from the group consisting of nylon 6, nylon 6/6, nylon 4/6, nylon 6/10, and aromatic nylons selected from the group consisting of poly(meta-phenylene isophthalamide) and poly(para-phenylene terephthalamide).

18. An inherently light- and heat-stabilized polyamide comprising:

(a) a backbone polymer chain having two chain ends;

(b) at least one piperidyl radical chemically bonded to one end of the backbone polymer chain of the inherently light- and heat-stabilized polyamide, the at least one piperidyl radical represented by formula (III):

(III)

wherein $R_1$ is hydrogen, benzyl, or a $C_1$–$C_{20}$ alkyl, $R_2$–$R_5$ are each hydrogen or the same or a different $C_1$–$C_6$ alkyl, X has n free valance bonding sites and is an alkyl or substituted alkyl having from about 1 to about 30 carbon atoms or an aryl or substituted aryl having from about 6 to about 20 carbon atoms, m is 0 or 1, and n is equal to 1, 2, or 3; and (c) at least one 4-amino-2,2,6,6-tetramethylpiperidyl radical chemically bonded to the other end of the backbone polymer chain of the inherently light- and heat-stabilized polyamide, the at least one 4-amino-2,2,6,6-tetramethylpiperidyl radical represented by formula (IV):

(IV)

wherein $R_7$ is hydrogen, benzyl, or a $C_1$–$C_{20}$ alkyl.

19. The polyamide of claim 18 wherein $R_1$ and $R_7$ are hydrogen, $R_2$–$R_3$ are each a methyl group, $R_6$ is a hydroxyl group, m is 0, and n is 1.

20. The polyamide of claim 18 wherein $R_1$ and $R_7$ are hydrogen, $R_2$–$R_5$ are each a methyl group, $R_6$ is a hydroxyl group, m is 1, X is a $CH_2$, and n is 1.

21. The polyamide of claim 18 further comprising at least one radical of at least one chain-regulating compound other than the compounds represented by formulae (III) and (IV), the at least one radical being chemically bonded to the backbone polymer chain.

22. The polyamide of claim 21 wherein the at least one chain-regulating compound is selected from the group consisting of monocarboxylic acids, dicarboxylic acids, amines, diamines, and combinations thereof.

23. The polyamide of claim 22 wherein the at least one chain-regulating compound comprises one or more dicarboxylic acids.

24. The polyamide of claim 23 wherein the one or more dicarboxylic acids is selected from the group consisting of $C_4$–$C_{10}$ alkane dicarboxylic acids, $C_5$–$C_8$ cycloalkane dicarboxylic acids, benzoic dicarboxylic acids, and combinations thereof.

25. The polyamide of claim 24 wherein the one or more dicarboxylic acids is selected from the group consisting of adipic acid, terephthalic acid, sebacic acid, decanedicarboxylic acid, isophthalic acid, and combinations thereof.

26. The polyamide of claim 22 wherein the at least one chain-regulating compound comprises one or more diamines.

27. The polyamide of claim 26 wherein the diamine is selected from the group consisting of $C_2$–$C_{18}$ alkane diamines, $C_5$–$C_8$ cycloalkane diamines, $C_6$–$C_{24}$ aryl diamines, and combinations thereof.

28. The polyamide of claim 18 wherein the polyamide further comprises at least one pigment.

29. The polyamide of claim 18 wherein the inherently light- and heat-stabilized polyamide is selected from the group consisting of nylon 6, nylon 6/6, nylon 4/6, nylon 6/10, and aromatic nylons selected from the group consisting of poly(meta-phenylene isophthalamide) and poly(para-phenylene terephthalamide).

30. An article comprising the inherently light- and heat-stabilized polyamide of claim 18.

31. The article of claim 30 wherein the article is selected from the group consisting of fibers, yarns, carpets, and textile fabrics.

32. The article of claim 31 wherein the article is a pigmented fiber.

33. The article of claim 31 wherein the article is a dyed fiber.

* * * * *